(12) United States Patent
Koivula

(10) Patent No.: US 8,874,493 B2
(45) Date of Patent: Oct. 28, 2014

(54) EXPERT SYSTEM, SYSTEM ELEMENT AND A METHOD TO BE USED IN THE SYSTEM

(75) Inventor: Tommi Koivula, Sundsberg (FI)

(73) Assignee: Profium Oy, Espoo (FI)

(*) Notice: Subject to any disclaimer, the term of this patent is extended or adjusted under 35 U.S.C. 154(b) by 281 days.

(21) Appl. No.: 13/440,115

(22) Filed: Apr. 5, 2012

(65) Prior Publication Data
US 2013/0268477 A1 Oct. 10, 2013

(51) Int. Cl.
*G06F 15/18* (2006.01)

(52) U.S. Cl.
USPC .......................................................... 706/12

(58) Field of Classification Search
USPC ................................................... 706/12, 45
See application file for complete search history.

(56) References Cited

PUBLICATIONS

Soma et al., Parallel Inferencing for OWL Knowledge Bases, 2008, IEEE, pp. 75-82.*
Ma et al., RStar: An RDF Storage and Query System for Enterprise Resource Management, 2004, ACM, pp. 484-491.*

* cited by examiner

*Primary Examiner* — David Vincent
(74) *Attorney, Agent, or Firm* — Nixon & Vanderhye PC

(57) ABSTRACT

An incremental forward-chaining reasoning rule based system is used where data tuples and rules can be inserted and deleted in runtime. The example method does not require storing or calculating a dependency tree in order to re-reason new implicit tuples. All tuples are associated with an inference counter to provide an efficient delete operation for tuples, without the need of re-calculate existing reasoning results.

20 Claims, 3 Drawing Sheets

EXPERT SYSTEM, SYSTEM ELEMENT AND A METHOD TO BE USED IN THE SYSTEM

FIELD

An exemplary embodiment relates to semantic web in a very general level. More specifically it belongs to a field of expert systems, especially to runtime forward-chaining reasoning method utilization of data tuples.

An exemplary embodiment relates also to a system that uses the method in the system and/or a system element, thereof. The exemplary embodiment relates also to use of such system elements. In other words, the exemplary embodiments of the invention are related to an expert system, a system element of knowledge representation system (KR) and a semantic web system and to methods for inferencing more data from explicitly given data using a set of rules. Rule processing also shares common characteristics with traditional formal description logic languages.

BACKGROUND

The Semantic Web is considered as an extension of the World Wide Web having information linked up in such a way as to be easily processable by machines. The Semantic Web is generally built on syntaxes which use URIs (Universal Resource Identifier) to refer data, usually in triple based structures, like RDF (Resource Description Framework). Information about the data, called metadata, is something that benefits especially from reasoning. Inferred metadata often reduces required human interaction and can also help with interoperability issues faced when combining or utilizing different data sources at the same time.

In the Semantic Web, rules about the data are often expressed as ontologies that describe the characteristics of the data by giving a shared vocabulary to express knowledge. Such ontology languages are for example Web Ontology Language (OWL) and RDF Schema (RDFS).

The delete operation is often seen as not being part of the Semantic Web systems, mostly because of the open world subsumption where everything is expected to be true unless stated otherwise. The subsumption makes deleting of a fact pointless, as the operation will not make the fact false. In real application use cases in most application domains, the delete operation can be seen as "undoing the insertion of the fact". With this definition, the delete operation must also "undo" the inference triggered by the inserted fact. This kind of behavior is needed, for example, when correcting erroneous data or when the data has changed over time.

An Expert System

An Expert System is considered to be a computer program structure that, when executed, uses symbolic knowledge and inference to reach conclusions (Mercadal, 1990, ss. 96-97). It derives most of its power from its knowledge. The key components of an expert system are an inference engine and a knowledge base. The separation of control (the inference engine) from knowledge (knowledge base) is a hallmark of an expert system. Other components of an expert system include a user interface, a knowledge-acquisition module, and an explanatory interface. Data tuples and horn clause rules as such are used in known expert systems.

Forward Chaining

The forward chaining inference is one of the two main methods of reasoning when using inference rules as such. The opposite of forward chaining is backward chaining. Forward chaining reasoning starts from the available tuples and the rules (the antecedent) and produces more data tuples (the consequent). Forward chaining suits well in reasoning systems where large number of data queries are made concurrently and query performance is important as all inferencing takes place together with data modification operations.

In forward chaining inference the most common strategy is to use total materialization where all implicit tuples are inferred into and from the tuple space during data modification operations.

One commonly used inference algorithm is the Rete algorithm (Forgy, 1979) that provides a generalized logical description of an implementation of functionality responsible for matching data tuples against rules by creating and maintaining a network of nodes consisting of rules and facts. As it is suitable for relatively small datasets with highly computational rules, it scales poorly when the data size increases. Also the working memory requirements are high as the whole Rete network must be kept in memory for maximum performance.

Decision tree learning, used in statistics, data mining and machine learning, uses a decision tree as a predictive model which maps observations about an item to conclusions about the item's target value. In these tree structures, leaves represent class labels and branches represent conjunctions of features that lead to those class labels. Similarly in reasoning, the decision tree branches are combinations of implicit or explicit tuples with a rule that produces implicit tuples the leaf nodes present. Use of decision trees leads to a computational complexity that can lead into performance and scalability issues with larger data sets and with complex rules. Also memory requirements are high as the decision tree must be stored and kept accessible all the time.

Known Methods for Delete

The most common approach for implementing a delete operation in the Semantic Web is to remove inferred tuples and re-infer all inferred tuples again. This approach may be valid in systems where data changes rarely and modifications to the data are mainly done in a batch operation, for example once a day. The time spent for re-inference can be lowered by partitioning the data and re-inferencing only the corresponding partitions, but it still may take a long time preventing read operations to occur simultaneously. For operational data that changes constantly this approach is intolerable as it requires exclusive write access to the tuple space and thus restricts concurrent queries and may take a long time to finish.

BRIEF SUMMARY OF EXEMPLARY EMBODIMENTS

Embodiments described below are combinable in suitable part.

A Runtime forward-chaining reasoning method of data tuples and/or rules to be inserted and/or deleted according to an exemplary embodiment comprises: keeping record of inference counters for each data tuple to provide a delete operation that does not require re-calculation of tuples inferred earlier.

The method according to an exemplary embodiment comprises re-running the method every time the set of explicit data tuples or rule set is changed.

The method according to an exemplary embodiment comprises at least one of the following: insertion of a tuple, deletion of a tuple, insertion of a rule, deletion of a rule.

The method according to an exemplary embodiment comprises changes of tuples and/or rules being arranged to be inputted so that they avoid re-inference of an existing implicit tuple.

The method according to an exemplary embodiment comprises inferring all implicit tuples when an ensemble of all explicit data tuples and/or an ensemble of all explicit rules have/has been inserted into the system.

The method according to an exemplary embodiment comprises making accessible at least one of the tuples of all explicit data tuples by using the terms of tuple pattern search.

The method according to an exemplary embodiment comprises loading a sub-ensemble of all implicit or explicit data tuples into the working memory used by the system.

The method according to an exemplary embodiment comprises at least one of the following:

evaluating sequentially at least one rule of the rules in the system,
inserting resulting implicit tuples,
deleting resulting implicit tuples and
updating inference counters.

The method according to an exemplary embodiment comprises a variable substitution for tuple pattern searches to search relevant tuples for any of the operations of an embodiment.

The method according to an exemplary embodiment comprises a selection of the appropriate existing rules to be evaluated.

The method according to an exemplary embodiment comprises identifying a number of loops and/or repeating the evaluation until the system will not change anymore.

The method according to an exemplary embodiment comprises stopping recursion of a tuple as a response to an initiative of observation of having the same explicit tuple and rule combination being processed already.

The method according to an exemplary embodiment comprises distributing at least one method step into another processing node than the executing node before distributing.

The method according to an exemplary embodiment comprises providing another node with an individual working memory, shared access to a rule set and/or right to execute a tuple pattern search against shared tuple data.

A system according to an exemplary embodiment is configured to execute the method according to an embodiment.

A system element according to an exemplary embodiment in an embodied system comprises executing means to perform a method step of a previous method claim.

A codec or a decoder according to an exemplary embodiment means of an embodied system element.

A codec or a decoder according to an exemplary embodiment comprises a data base module to access to a data base of rules, tuples and/or configuration data.

An inference engine according to an exemplary embodiment is configured to execute a method.

An expert system according to an exemplary embodiment comprises a system element wherein the system comprises at least one element of the following:

user interface,
a knowledge-base,
a knowledge acquisition module and
an explanatory interface.

The expert system according to an exemplary embodiment comprises at least one of the system elements of an embodied element.

A software product according to an exemplary embodiment comprises software structure that are configured to load a computer code into a memory of a computer to be executed in a processor connected to said memory, a computer code arranged to execute an embodied method.

The exemplary embodiments are free from certain restrictions and thus not restricted to a particular language, thus also support other formal semantics than description logic (DL).

The exemplary method uses monotonic logic to infer new knowledge using data tuples and horn clause rules.

The exemplary method does not need Rete networks or decision trees to operate at all. Decision trees are shown in the examples to demonstrate the inference counters used by the method embodied but they are not used by the actual exemplary method in any way.

In the exemplary embodied method variants, the data consists of an ordered list of elements whose structure as such is known, e.g. the data tuples (Guth, 1998 as such). The data is a tuple space as an associative memory accessible in the embodied method. In an exemplary embodied method, in a Semantic web the tuples have often at least three elements: a subject, a predicate and an object. A skilled person in the art knows that the number of elements is exemplary and thus the number of elements is not limited only to the exemplified three. In the embodied method, a Semantic web tuple space can be expressed as a graph where each subject and object are nodes and predicates are directed links between the subject node and the object node.

A method according to an exemplary embodiment practices incremental forward chaining reasoning in a rule based system where data tuples and rules can be inserted and deleted in runtime. The exemplary embodied method does not require storing or calculating a dependency tree in order to reason new implicit tuples. All tuples are associated with an inference counter to provide an efficient delete operation for tuples without the need for re-calculating existing reasoning results. Thus, the dependency tree for reasoning for new tuples can be omitted to use less memory and computing capacity thus saved, in addition to which the subsequent data modification operations do not require updating the dependency tree.

A side effect from this is that the pruning of the above mentioned tree is not needed either, as the whole tree treatment can be omitted and even more computing capacity is saved as well as time.

Services and applications that need to constantly execute data requests and data modification operations as such in the known techniques, like OLTP (On-Line Transaction Processing) and data routing systems, benefit from the incremental nature of the method embodied by the invention, because it allows shorter response times as re-calculation of implicit tuples or modifications of the inference dependency tree are not required.

An application area that greatly benefits from real-time reasoning and reduced computational complexity is news routing into subscribed customers. Routing news often involves complex rules to be evaluated in order to decide which customers are interested in receiving the particular piece of news. Also news routing and delivery is concurrent by nature, processing large amount of incoming news constantly that makes long computation pauses and nightly pre-processing intolerable.

According to an exemplary embodiment a system element is configured to implement the method according to an exemplary embodiment. According to an exemplary embodiment, the system element is a news system element. According to an exemplary embodiment, a news server is implemented within a system according to an exemplary embodiment.

Saving computing capacity, memory and/or time is advantageous in general, especially in portable devices and embedded systems, where processing power is limited due to power consumption and size limitations.

The method according to an exemplary embodiment uses tuple pattern searches to access the existing fact/inferred data tuples that makes it possible to use external memory, like a hard disk, to store data tuples. It also makes it possible to use index data structures to efficiently evaluate the pattern match queries.

BRIEF DESCRIPTION OF THE DRAWINGS

In the following, a reference is made to the figures and the symbols therein to explain exemplary embodiments via the so indicated examples described in the embodiments. The same reference numerals do not denote necessarily an identical object in another figure, but a skilled person in the art can deduce the potential difference, if any, from the shown context.

DETAILED DESCRIPTION OF EXEMPLARY EMBODIMENTS

Figure 1:
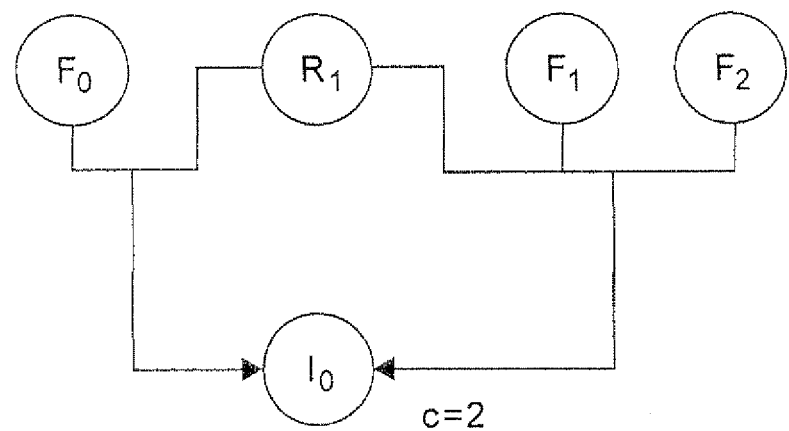
FIG. 1 illustrates interference counter and tuples according to an exemplary embodiment.

The rules are horn logic clauses (Horn, 1951) that can be expressed as an implication formula:

$$(p_0 \wedge p_1 \wedge \ldots \wedge p_n) \to p_0$$

For simplicity reasons, the embodied method allows more than one positive literal in the disjunction because it can be easily seen that as such horn clauses having identical negative elements p but different positive element p' can be combined into an implication formula:

$$(p_0 \wedge p_1 \wedge \ldots \wedge p_n) \to (p_0' \wedge p_1' \wedge \ldots \wedge p_m')$$

The method according to an exemplary embodiment works per tuple basis, e.g. in an embodiment, each applicable rule is evaluated for every data tuple inserted or deleted. The method will continue to process new operations until, based on the inference counters, no new reasoning is required.

Tuples are unique in the tuple space and therefore identical tuples cannot be present in the same space. Distinction between explicit tuples (i.e. facts) and implicit tuples (i.e. inferred tuples) is important in certain cases, for example in the delete operation: an implicit tuple cannot be explicitly deleted from the space as it would make the tuple space inconsistent with the current rules. However, the exemplary method does not restrict explicitly adding a tuple that is already inferred, or will be inferred, causing the same tuple to occur as an implicit and an explicit tuple at the same time, Also deletion of a rule or an explicit tuple may cause implicit tuples to be deleted if and only if they are not inferred by some other rules and tuples still in the space. Therefore explicit tuples and implicit tuples are considered embodied by this method as distinct tuples, notated as A.sup.F (fact tuple A) and A.sup.I (inferred tuple A), even if they are in context of the tuple space representing exactly the same tuple A.

An advantage of exemplary embodiments is that rules can be added to the system, and especially also removed when needed so that a re-deduction is not necessarily needed at all.

The rules in the embodied method are horn logic clauses that can be expressed as an implication formula:

$$R:(L_0 \wedge L_1 \wedge \ldots \wedge L_n) \to (L_0' \wedge L_1' \wedge \ldots \wedge L_m'),$$
where $$L_k=(v_0, \ldots, v_i), v=(\text{variable}|\text{constant})$$

Literals in the rules must be of same length as the tuples in the tuple space. Rules for a tuple space with tuples length of three must have literals that have also length of three. For example:

$$L_1=(?x:\text{knows}?y)$$

In the example above, the literal $L_1$ has two variables (marked with ?-prefix) and a constant value "knows" (marked with :-prefix). A constant can be any value of any form depending on the application area and value space used for the values of tuples. Textual constants like predicate ":knows" are presented without intention to limit the scope of related embodiments. Let data tuple F and rule R be:

$$F=(t_0, \ldots, t_i)$$

$$R:(L_0 \wedge L_1 \wedge \ldots \wedge L_n) \to L'$$

According to an exemplary embodiment, the rule R is considered applicable for a tuple F if and only if:

A method according to an exemplary embodiment uses a rule rewrite based on tuples inserted and removed. In an embodiment of the invention, an ensemble of literals comprising variables of at least one literal are substituted with the values from the actual tuple and results are calculated based on all variations of the rewritten rules.

A rule rewriter is a subsystem that executes the variable substituting. Substituting a rule R with values from fact F $$R:(L_1 \wedge L_1 \wedge \ldots \wedge L_n) \to L_0'$$

produces the following rule applications $R^{1'} \ldots R^{n'}$:

$$R^{1'}:(F \ \wedge \ L_2' \ \wedge \ \ldots \ \wedge \ L_n') \to L_0'$$

$$\ldots$$

$$R^{n'}:(L_1^{n'} \ \wedge \ L_1^{n'} \ \wedge \ \ldots \ \wedge \ L_{n-1}^{n'} \ \wedge \ F) \to L_0^{n'}$$

where one of the negative literals $L_i$ is replaced with the fact F and all variables occurring in $L_i$ are substituted from other literals (negative and positive) with the values from tuple F:

$$L_i=(v_0^i, \ldots, v_j^i)$$

$$k \neq i: L_k' = (v_0^k, \ldots, t_m, \ldots, v_j^k), \text{ where } v_m^k = v_m^i$$

For example, a rule $R_1$ contains two literals $L_1$ and $L_2$ as antequents and a $L_3'$ as a consequent:

$$R_1 = (?x:\text{childOf}?y) \wedge (?x:\text{childOf}?x) \to (?x:\text{grandParent}?z)$$

$$\Leftrightarrow$$

$$R_1 = L_1 \wedge L_2 \to L_3'$$

Together with fact $$F_1=(:p1:\text{childOf}:p2)$$

rule $R_1$ will produce the following rewritten rule applications $R_1^{1'}$ and $R_1^{2'}$:

1) Substitute variables in literal $L_1$ using values from fact $F_1$:

$$R_1^{1'}=(:p1:\text{childOf}:p2) \wedge (:p2:\text{childOf}?z) \to (:p1:\text{grandParent}?z)$$

2) Substitute variables in literal $L_2$ using values from fact $F_1$:

$$R_1^{2'}=(?x:\text{childOf}:p1) \wedge (:p1:\text{childOf}:p2) \to (?x:\text{grandParent}:p2)$$

In an exemplary embodiment, these rewritten rules $R_1^{1'}$ and $R_1^{2'}$ are evaluated against the tuple space to get a table of variable bindings. Implicit tuples are constructed using the variable bindings and the right side of the rewritten rule application.

Let execution of left side of $R_1^{1'}$ return the following variable bindings:

$$\frac{?z}{\begin{array}{c} :p3 \\ :p4 \end{array}}$$

Using these bindings, the following implicit tuples can be constructed from the right side of the implication in $R_1^{1'}$:

As a result of the exemplary method implicit tuples $I_1$ and $I_2$ are under consideration for insert, delete or updating inference counters depending on the operation at hand.

Some of the rewritten rule applications can be left out immediately in an exemplary embodiment, if they are not compatible with the rule.

$$R_2 = (?x:knows?y) \rightarrow (?y:knows?x)$$

For example rule $R_2$ has no tuple patterns that would match for the tuple $F_7$ making rule $R_2$ unnecessary to be executed when inserting or deleting tuple $F_1$.

Inference Counters

In an exemplary embodiment, the reasoning can result in same tuples from different rules and different fact tuples. Inferred tuples can also be inserted as a fact too, in an exemplary embodiment. These characteristics apply using counters (e.g. variable data associated with each node) to keep a record of which inferenced tuples can be removed and which can not.

An inference subsystem is a part of the system that evaluates inference, modifies the tuple space and maintains inference counters.

For every inferred tuple the inference counter $c>=1$ indicates the number of rewritten rule applications that produce the inferred tuple. For inferred tuple $A^I$ with inference counter $c=n$, there are exactly n distinct rule applications R' that produce $A^I$ when executed.

When represented as an inference tree, the counter c can be seen (in FIGS. 1-4) as the number of incoming arrows to the inferenced node.

An example of tuple $I_0$ with inference counter $c=2$ (two incoming arrows) is indicated in FIG. 1.

Comparing the inference counters as together with the inference tree commonly used with reasoning, two significant characteristics should be noted: 1) during an insert or delete operation, the actual tuple space is edited only if the existence of the tuple changes and 2) inference counters of implicit triples far lower in the dependency tree (if one such would be used) do not need to be changed if the counters upper in the dependency tree change. Complex rules and rules that tend to produce the same output, like inferencing an instance type based on property values, do not require more computation or modifications in situations where a dependency tree would be very complex and the length of the sub-tree large.

Insert Operation

The inference subsystem is responsible for tuple and rule insertion operations.

Insertion of an explicit tuple or a rule contains at least one of the following operations:

1. assertion that the tuple is not already present in the tuple space as a fact, 2. assertion that the rule is not already present in the system, 3. if the tuple is already present as an implicit tuple, mark it as an explicit tuple, 4. if the tuple is not present in the tuple space, add it and execute inference embodied by the method for the tuple, 5. if rule is not present in the system, add rule into the system, 6. if rule is not present in the system, execute the literals of left side of the rule without any variable substitution, construct tuples based on results and the right side of the rule and add them as new implicit tuples.

For every implicit tuple inferred by the method, one of the following operations takes place:

1. If the tuple is already present, increase the inference counter of the tuple, 2. If the tuple is not already present, insert it into the tuple space, set inference counter to 1 and execute inference as embodied by the method.

Figure 2:
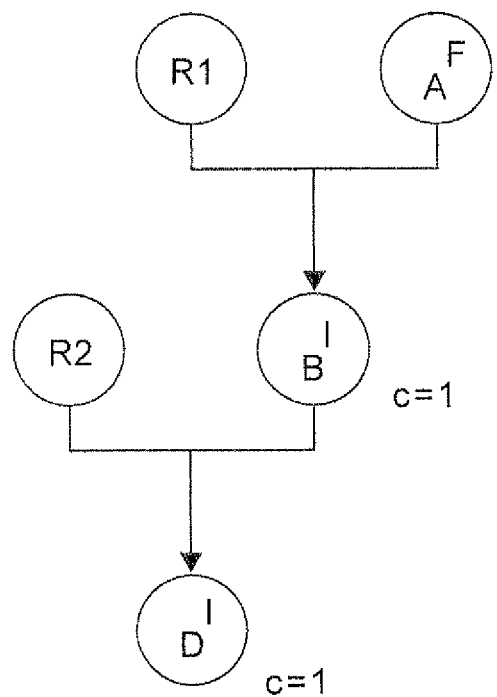
FIGS. 2-3 illustrate how tuple changes change an imaginary dependency tree for an exempla embodiment.
Figure 3:
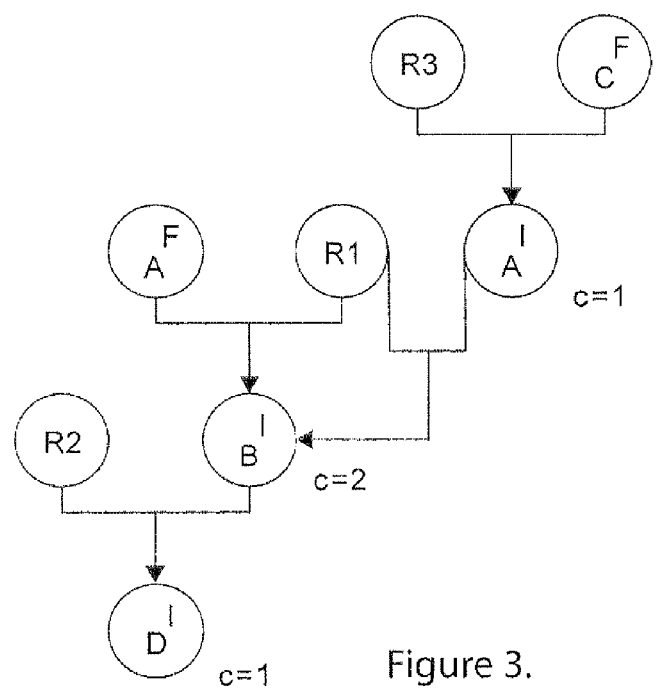

Let us consider the following example where reasoning is presented as a tree in accordance with the embodied method, by referring to FIG. 2 and FIG. 3. In an exemplary embodiment, it infers tuple B from rule R1 and fact A and tuple D from tuple B and rule R2. Inference counter is $c=1$ for both inferenced tuples B and D (as there is only one arrow pointing to the node when represented as a dependency tree).

An imaginary dependency tree after insert of a tuple A, explicit tuples B and D inferred and their inference counters is indicated to illustrate an example via FIG. 2.

An imaginary dependency tree after inserting explicit tuple C, inserted implicit tuple A and updated inference counter of implicit tuple B is indicated to illustrate an example via FIG. 3.

Let us insert a fact C together with a rule R3 (FIG. 3):

According to an exemplary embodiment, the tuple A is inferred from C and now tuple A is at the same time a fact and also an inferred tuple. Inserting inferred tuple A causes counter of B to be increased. This will not trigger any new inference to be run and also inference counter of tuple D will not be increased as the tuple B is already present in the tuple space as an inferred tuple.

An example is given how to insert a tuple T according to an exemplary embodiment. In the example, also a rule insertion is indicated in the pseudo code notation.

According to an exemplary embodiment, the Implementation tracks the path from deleted explicit tuple to the end of the chain to make sure same tuple is not processed multiple times.

```
Inserting tuple T:
    insert(T):
        insert(T, emptyList)
    insert(T, previousTuples):
        if T is not a fact:
            if previousTuples contains T:
                return
            ++counterFor(T)
        if repository contains T:
            return
        insert T into repository
        for each rule R:
            if rule R has no compatible antequent triple patterns with T:
                break
            for each unique rewritten rule application R' of R(T):
                S = execute(R')
                for each tuple T2 in S:
                    add T2 into previousTuples
                    insert(T2, previousTuples)
                    remove T2 from previousTuples
```

-continued

```
Inserting rule R:
    insert(R):
        if repository contains R:
            return
        S = execute(R)
        for each tuple T in S:
            insert(T)
        insert rule R
```

Delete Operation

The inference subsystem is responsible for tuple and rule deletion operations.

Deletion of an explicit tuple or a rule contains at least one of the following operations:

1. assertion that the tuple is present in the tuple space as a fact,
2. assertion that the rule is present in the system,
3. if the tuple is present in the tuple space as an implicit tuple, remove explicit tuple mark for it and execute inference embodied by the method for the tuple,
4. if the tuple is present in the tuple space as a fact and not as an implicit tuple, remove the tuple from tuple space and execute inference embodied by the method for the tuple,
5. if the rule is present in the system, remove rule from the system,
6. if the rule is present in the system, execute the literals of left side of the rule without any variable substitution, construct tuples based on results and the right side of the rule and remove them as implicit tuples.

For every implicit tuple inferred by the method at least one of the following operations takes place:

1. If the tuple is present, decrease the inference counter of the tuple
2. If the inference counter of the tuple is (after decrement) zero (c=0), execute inference as embodied by the method,
3. If the tuple is not present as an explicit tuple and inference counter of the tuple is (after decrement) zero (c=0), remove tuple from the tuple space As an example, let us consider a deletion of a fact tuple A from the tuple space shown in the FIG. 2 as an imaginary dependency tree. As in the embodiment, the fact status of tuple A will be removed, but it is still inferred from tuple C. Removing the fact A (step 1) causes inference to occur (step 2), and as a result counter of B to be decreased (step 3). Counter of D will not be changed as B will not be removed (c is still positive).

Figure 4:
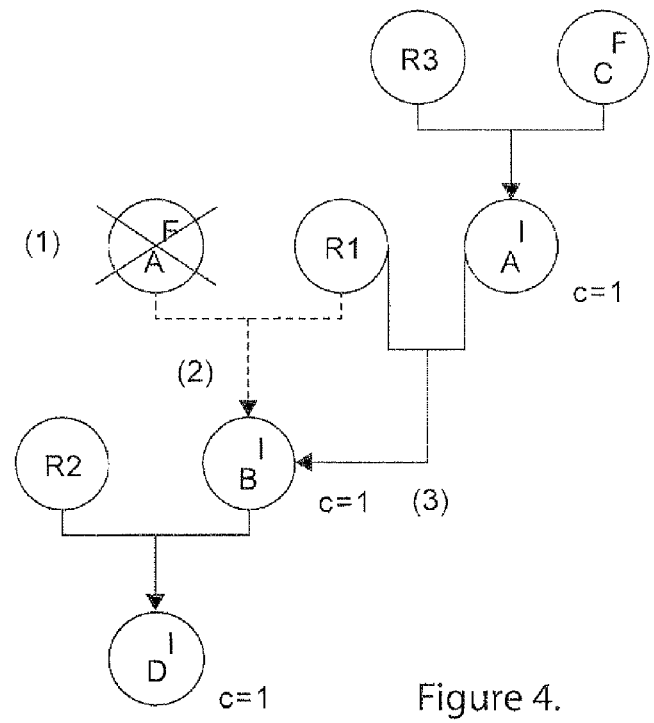
FIGS. 4-5 illustrate how tuple changes change an imaginary dependency tree for an exemplary embodiment.

An imaginary dependency tree after deleting explicit tuple A and updated inference counter of implicit tuple B is indicated to illustrate an example via FIG. 4.

Figure 5:
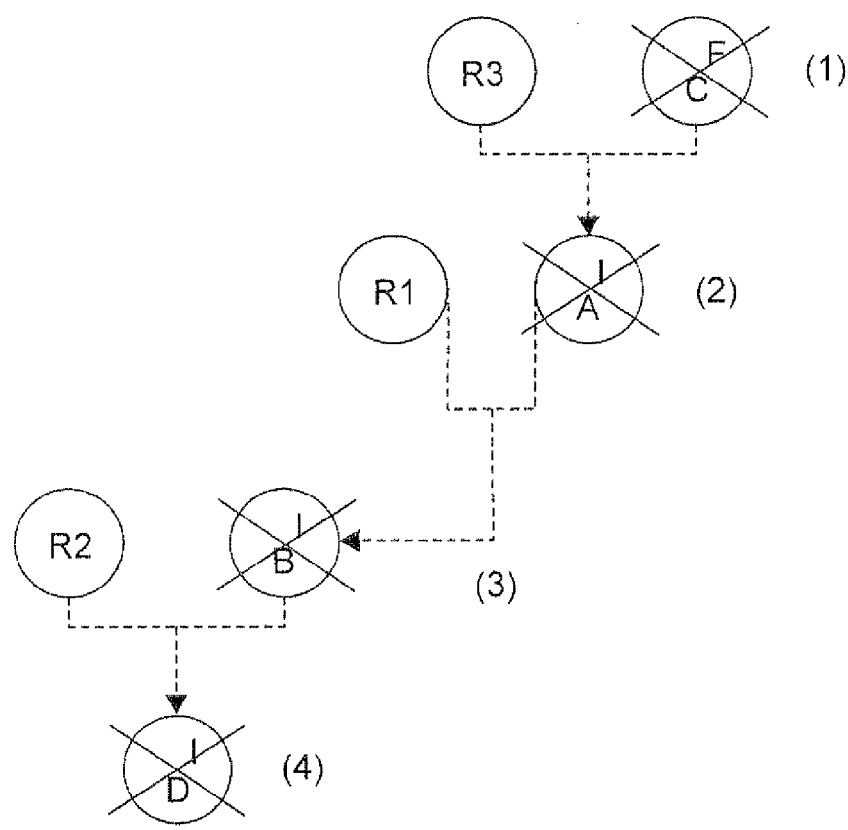

And let us finally delete fact tuple C (FIG. 5). The deletion of C (step 1) will cause deletion of an inferred tuple A (step 2) as inference counter of A hits 0. Deletion of inferred tuple A will also cause deletion of B (step 3) and finally deletion of D (step 4).

An imaginary dependency tree after deletion of fact tuple C and deletion of inferred tuples A, B and D is indicated to illustrate an example via FIG. 5.

According to an exemplary embodiment, the Implementation must track the path from deleted explicit tuple to the end of the chain to make sure the same tuple is not processed multiple times.

```
Deleting tuple T:
    delete(T):
        delete(T, emptyList)
    delete(T, previousTuples):
        if repository doesn't contain T:
            return
        if T is not a fact:
            if previousTuples contains T:
                return
            if --counterFor(T) > 0:
                return
        for each rule R:
            if rule R has no compatible antequent triple patterns with T:
                break
            for each unique rewritten rule application R' of R(T):
                S = execute(R')
                for each tuple T2 in S:
                    add T2 into previousTuples
                    delete(T2, previousTuples)
                    delete T2 from previousTuples
        delete T from repository
Deleting rule R:
    insert(R):
        if repository doesn't contain R:
            break
        S = execute(R)
        for each tuple T in S:
            delete(T)
        remove rule R
```

An exemplary method can be realized by a device that is capable of automatically routing information, like news, to other nodes in the network by using complex and general routing rules.

A coding system comprises a codec/decoder The codec of the coding system comprises coding means that are arranged to form a tuple space of sets of incoming information. The codec also comprises coding means for rules additions and deletions received by the device.

According to an exemplary embodiment, the device infers routing information using the rule set in the device, the tuple space in the device and the encoded information as tuples. The routing information is used to determine which nodes in the network are subscribed for this kind of information. The device decodes the information from the tuple space and transmits it into the corresponding nodes in the network.

List of Abbreviations and Symbols

| Symbol/abbreviation | Definition |
|---|---|
| $p_n$ | n:th literal in an implication formula |
| $p_n'$ | n:th negative literal in an implication formula. Negative literals exist by definition in the right side of the implication formula |
| R | a rule expressed as a horn logic clause visualized an implication formula |
| $R_n$ | n:th rule |
| L | literal of a rule |
| $L_n$ | n:th positive literal in the rule. Positive literals construct the left side of the rule |
| $L_n'$ | n:th negative literal in the rule. Negative literals construct the right side of the rule |
| L' | abbreviation for all negative literals $L_0' \ldots L_n'$ in the rule |
| $v_n$ | n:th variable or constant in a literal L that represents a tuple pattern |
| $v_n^k$ | n:th variable or constant in a literal $L_k$ |
| ? x | tuple pattern variable "x" that can be part of a literal L |
| : value | tuple pattern constant "value" that can be part of a literal L. Constant can be of any textual or non-textual value depending on the value space used for the tuple space |
| F | tuple that is explicitly inserted into the tuple space, e.g. an explicit tuple |
| $F_n$ | n:th explicit tuple |

-continued

| Symbol/abbreviation | Definition |
|---|---|
| I | tuple that is implicitly inferred into the tuple space, e.g. an implicit tuple |
| $I_n$ | n:th implicit tuple |
| $t_n$ | n:th value in a tuple |
| $A^F$ | tuple A that is an explicit tuple |
| $A^I$ | tuple A that is an implicit tuple |
| $R_n^{k'}$ | k:th rule application of rule $R_n$ that has all variables occurring in n:th literal substituted with values |
| $R_n'$ | a rule application or rule applications of rule $R_n$ |
| R' | a rule application or rule applications of rule R |
| c | inference counter for an implicit tuple |

BIBLIOGRAPHY

Forgy, C. (1979). *On the efficient implementation of production systems*. Ph.D. Thesis, Carnegie-Mellon University.

Guth, R. (1998, August). More than just another pretty name: Sun's Jini opens up a new world of distributed computer systems. *Sun World*.

Horn, A. (1951). On sentences which are true of direct unions of algebras. *Journal of Symbolic Logic*, 16, 14-21.

Mercadal, D. (1990). *Dictionary of artificial intelligence*. New York, N.Y: Van Nostrand Reinhold.

The invention claimed is:

1. A machine-implemented runtime forward-chaining reasoning method for inserting and/or deleting data tuples and/or rules in a tuple space of sets of information in a semantic web, said method comprising:
configuring at least one computer and associated memory with executable program instructions to process tuples in said memory, wherein said processing includes keeping a record with inference counters of incoming tuple predicates for each data tuple to provide a tuple delete operation that does not require re-calculation of tuples earlier inferred.

2. The method of claim 1 wherein the method comprises re-running the processing of tuples every time a set of explicit data tuples or a rule set is changed.

3. The method of claim 1 wherein the method comprises at least one of the following: insertion of a tuple, deletion of a tuple, insertion of a rule, and deletion of a rule.

4. The method of claim 1 wherein changes of said tuples and/or rules are arranged to be inputted to said process so that they avoid re-inference of an existing implicit tuple.

5. The method of claim 4 wherein the method comprises inferring all implicit tuples when an ensemble of all explicit data tuples and/or an ensemble of all explicit rules have/has been inserted into the tuple space.

6. The method of claim 1, wherein the method comprises making accessible at least one of the tuples of all explicit data tuples in the tuple space by using the terms of a tuple pattern search.

7. The method of claim 6 wherein a sub-ensemble of all implicit or explicit data tuples is loaded into said memory.

8. The method of claim 1, wherein method comprises at least one of the following:
evaluating rules sequentially,
inserting resulting implicit tuples,
deleting resulting implicit tuples, and
updating respectively corresponding inference counters.

9. The method of claim 8, wherein the method comprises variable substitution for tuple pattern searches to search relevant tuples for any of said evaluating, inserting, deleting and updating operations.

10. The method of claim 1, wherein the method comprises selection of existing rules to be evaluated.

11. The method of claim 10, wherein the method comprises identifying a number of loops and/or repeating the evaluation of existing rules until the tuple space will not change anymore.

12. The method of claim 8, wherein the method comprises stopping recursion of a tuple as a response to the same explicit tuple and rule combination having been processed already.

13. The method according to claim 1, wherein the method comprises distributing at least one process step into another processing node than an executing node before said distributing step.

14. The method of claim 13, wherein the method comprises providing said another processing node with individual working memory, shared access to a rule set and/or a right to execute a tuple pattern search against shared tuple data.

15. A system for inserting and/or deleting data tuples and/or rules in a tuple space of sets of information in a semantic web, said system comprising:
configuring at least one computer and associated memory with executable program instructions to process tuples in said memory, wherein said processing includes keeping a record with inference counters of incoming tuple predicates for each data tuple to provide a tuple delete operation that does not require re-calculation of tuples earlier inferred.

16. A codec or a decoder for inserting and/or deleting data tuples and/or rules in a tuple space of sets of information in a semantic web, said codec or decoder comprising:
configuring at least one computer and associated memory with executable program instructions to process tuples in said memory, wherein said processing includes keeping a record with inference counters of incoming tuple predicates for each data tuple to provide a tuple delete operation that does not require re-calculation of tuples earlier inferred.

17. The codec or decoder of claim 16 comprising a data base module having access to a data base of rules, tuples and/or configuration data.

18. The system of claim 15 configured to provide an inference engine.

19. The system of claim 15 configured to provide an expert system comprising at least one of the following:
a user interface,
a knowledge-base,
a knowledge acquisition module, and
an explanatory interface.

20. A software computer program product comprising a tangible non-volatile digital memory configured to load a computer code therefrom into a memory of a computer to be executed in a processor connected to said memory, said computer code being configured to execute the method of claim 1.

* * * * *